United States Patent
Retali

(10) Patent No.: US 6,594,497 B1
(45) Date of Patent: Jul. 15, 2003

(54) RADIO COMMUNICATION DEVICE AND CORRESPONDING METHOD FOR SETTING UP A COMMUNICATION

(76) Inventor: Dominique Retali, 26 rue Rivière, 94170 Le Perreux (FR)

( * ) Notice: Subject to any disclaimer, the term of this patent is extended or adjusted under 35 U.S.C. 154(b) by 0 days.

(21) Appl. No.: 09/623,754

(22) PCT Filed: Mar. 3, 1999

(86) PCT No.: PCT/FR99/00473

§ 371 (c)(1),
(2), (4) Date: Sep. 8, 2000

(87) PCT Pub. No.: WO99/46870

PCT Pub. Date: Sep. 16, 1999

(30) Foreign Application Priority Data

Mar. 9, 1998 (FR) .......................................... 98 02835

(51) Int. Cl.$^7$ .............................. H04B 7/00; H04Q 7/20
(52) U.S. Cl. ....................... 455/517; 455/500; 455/507; 455/560; 455/561

(58) Field of Search ................................. 455/517, 500, 455/507, 70, 560, 561, 13.3, 13.4

(56) References Cited

FOREIGN PATENT DOCUMENTS

| EP | A2777399 | 6/1997 |
|----|----------|--------|
| WO | A1-9428684 | 12/1994 |

Primary Examiner—Thanh Cong Le
Assistant Examiner—Andrew T Harry
(74) Attorney, Agent, or Firm—Birch, Stewart, Kolasch & Birch, LLP

(57) ABSTRACT

The invention concerns a radio communication device comprising a base station installed on a vehicle and at least a mobile station in the possession of a residence subscriber located on a site, and said radio communication device is operated by detecting in the base station when the vehicle reaches a site available time windows then by transmitting into these time windows a signal representing the vehicle identity.

5 Claims, 1 Drawing Sheet

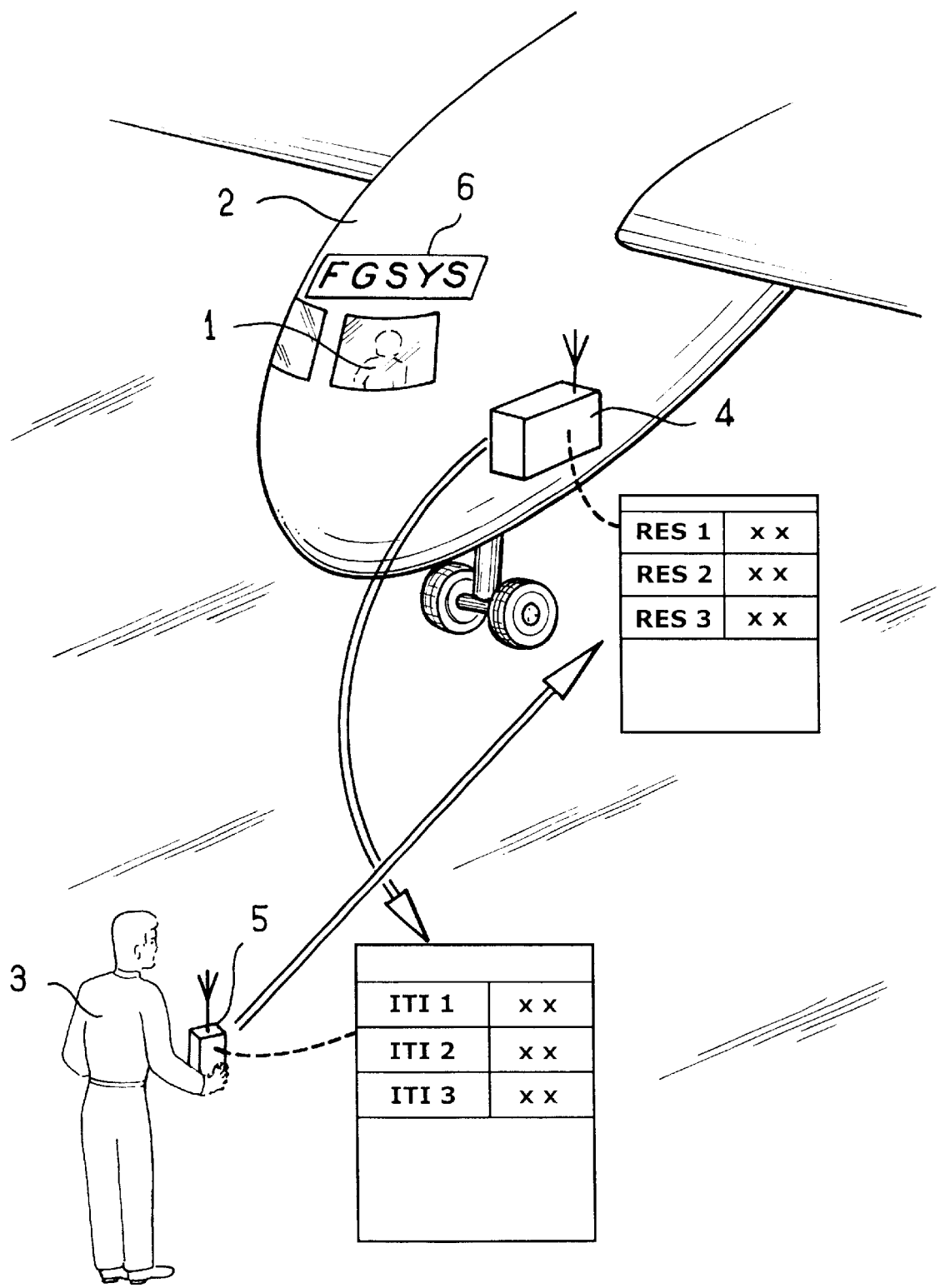
FIG_1

RADIO COMMUNICATION DEVICE AND CORRESPONDING METHOD FOR SETTING UP A COMMUNICATION

This application is the national phase under 35 U.S.C. § 371 of PCT International Application No. PCT/FR99/00473 which has an International filing date of Mar. 3, 1999, which designated the United States of America.

The present invention concerns a radio communication device and the corresponding process for establishing a communication.

The invention is applied more particularly although not exclusively to establishing a communication between the crew members of an aircraft and the ground staff of an airport where the aircraft is touching down.

It is known that, when an aircraft arrives on a site, it is necessary for the members of the crew to restore a link to the ground staff. The first communication to be established is that which provides a link between the pilot and the runway staff responsible for directing the aircraft to its parking position. The radio frequencies which are usually employed for communication with the control tower generally being close to saturation, it is not possible to envisage using those frequencies for communication with the ground staff.

In the absence of suitable means for a radio communication, the communication between the pilot and the runway staff is therefore implemented visually by gestures. Irrespective of the difficulties that such a communication can involve under certain meteorological conditions when visibility is poor, it is necessary for the runway staff to be in the field of vision of the pilot, which in itself is a very major operational constraint.

When the aircraft has reached its parking position, it is known to establish a communication between the runway staff and the aircraft crew by connecting an external communication circuit to the internal communication circuit of the aircraft. That link is made by means of a wire and also constitutes a serious constraint which affects the freedom of movement of the ground staff.

In order to remedy those disadvantages, as disclosed in particular in document WO 94/28684, it has been envisaged that communications can be established between the crew members of an aircraft and the ground staff by using the existing radio communication networks which make it possible in particular to establish a communication between itinerant subscribers which are the crew members of the aircraft and resident subscribers which are the members of the ground staff of an airport, in particular the runway staff. However, by virtue of the itinerant subscribers being related to a site of origin, the cost of such communications is high so that this communication system is not the optimum one.

Taking into account the apparent mobility of the itinerant subscribers and the apparent immobility of the resident subscribers, consideration has also been given to locally creating a radio communication system comprising a base station carried by a resident subscriber and considering the aircraft as mobile stations provisionally associated with the base station in accordance with the link which is usually implemented in a conventional radio communication system between a mobile station and a base station. However it was found that a structure of this type was not suited to setting up a communication of a number of runway staff members with the same aircraft, which however it is desirable to be able to implement.

In accordance with the invention there is proposed a radio communication system between at least one itinerant subscriber installed in a vehicle irrespective of the type of such vehicle (aircraft but also train, boat or ship, truck . . . ) and at least one resident subscriber installed on a site, the radio communication system comprising a base station installed on the vehicle and directly associated to at least one mobile station possessed by a resident subscriber on the site.

Thus, by a reversal of the usual structure of the system, a central function, in relation to the communications envisaged, is given to the aircraft or more generally to the vehicle carrying the base station, which makes it possible in particular by a procedure for unique identification of the base station to produce a relationship between a plurality of itinerant subscribers with the resident subscribers when the aircraft arrives on a site.

In accordance with another aspect of the invention it concerns a process for establishing a communication between at least one itinerant subscriber in a vehicle and at least one resident subscriber on a site, by means of a radio communication system comprising a base station installed on the vehicle and at least one mobile station possessed by a resident subscriber, said process comprising the steps of detecting in the base station upon the arrival of the vehicle on a site available time windows and emitting in said time windows a signal representative of an identity of the vehicle in order to make itself directly known to the mobile stations present on the site. Thus, by ensuring that identification of the vehicle is effected in an available time window, it is possible for all the resident subscribers listening in within a suitable range to detect the arrival of the vehicle, in which respect the different vehicles on the site can thus be detected and identified.

To carry the process into effect, the identity of the vehicle giving rise to the emission of a signal can be a permanent identity (registration or record number of the vehicle) or a provisional identity which is representative of the transport operation (flight number or manifest number . . . ) or an association of those types of identity.

In accordance with a further advantageous aspect of the invention the process comprises the step of exchanging the directory data between the base station and at least one mobile station. The term directory data is used to denote not only the name of the subscribers but also other items of useful information for the establishment of communications such as link organisations or the functions of the subscribers. The resident subscribers and the itinerant subscribers are thus respectively informed of the local call numbers and identifications of the persons communicating therewith, in such a way that communications can be easily established between the itinerant subscribers and the resident subscribers.

Other features and advantages of the invention will be further apparent from the following description of a particular embodiment of the device according to the invention and a particular manner of carrying out the process according to the invention, with reference to the accompanying single FIGURE which is a diagrammatic representation of the radio communication device according to the invention.

Referring to the FIGURE, the radio communication device according to the invention is described in relation to itinerant subscribers 1 who are members of the crew of an aircraft 2 and resident subscribers 3 who are members of the ground crew or staff of an airport site on which the aircraft touches down.

In accordance with the invention the aircraft 2 is equipped with a base station 4 of a radio communication system while the members of the ground staff 3 possess a mobile station 5 adapted to communicate with the base station 4. The members of the crew 1 of the aircraft 2 can be connected to the base station 4 either by a wired connection or by a wireless connection.

In order to be able to establish communications with the resident subscribers, it is necessary for the base station to make itself known thereto. For that purpose, as in a conventional radio communication system, the base station emits a beacon signal which permits the mobile stations to identify it. Preferably the identification of the base station in the beacon signal includes the aircraft identification and/or the flight number possibly in compressed form in the case where the number of bits available within the beacon signal is not sufficient to permit the inclusion as such of the full identity of the aircraft. Identification of the base station thus permits simultaneous identification of the aircraft or the corresponding flight number.

In conventional manner, the radio communication system according to the invention operates in a time division mode on one or more frequencies and for that purpose comprises a frame having time windows allocated in an organised fashion to the mobile stations and to the base station for the emission of the communication signals. So that the arrival of a fresh aircraft can be perceived by resident subscribers who are each listening for at least one beacon signal emitted by the base station of an aircraft which is already present on the site, provision is made to detect in the base station of an aircraft arriving on said site the time windows which are already occupied by the base stations of aircraft already present and to emit the beacon signal representative of the identity of the arriving aircraft, preferably in a time window which is not simultaneous with those already used for the aircraft which are already present, at a frequency which can be used by the base station. It is thus possible for a resident subscriber to be in relationship simultaneously with a plurality of base stations and therefore to receive calls from any one of said base stations or to transmit calls towards one of them.

When the arrival of a base station is detected by a mobile station, the corresponding resident subscriber has the option of connecting himself and it is possible to provide different modes of implementation for making that connection. In accordance with a first mode of implementation which is reserved essentially for the runway staff, provision is made for using the registration of the aircraft, whether it can be read as it appears in large letters on the fuselage of the aircraft as illustrated by the box 6 in the FIGURE, or whether it is known a priori by the runway staff. In that case it is provided that acquisition of the identification signs by a resident subscriber on the mobile station which he holds automatically communicates him with the pilot of the aircraft. So that a team leader of the runway crew can also be involved in the conversation, provision can be made for automatic conferencing when a plurality of mobile stations are communicated with the same itinerant subscriber.

In accordance with a second implementation of the process, which can also be combined with the first implementation, detection of the arrival of a base station on a site by a resident subscriber automatically causes the emission towards said base station of directory data in respect of the resident subscribers, identified as RES1 through RES3 in the FIGURE, and the return emission towards at least one resident subscriber of directory data relating to the itinerant subscribers, identified as ITI1 through ITI3 in the FIGURE. The directory data comprise preferably not only the name and the call number of the different subscribers but also their function and the organisation to which they are linked. It is then possible for a subscriber to consult the dedicated directory which is obtained in that way and to call the communicating party of his choice.

In order to permit evolution of the situation, identification of the aircraft which are present on the site is preferably effected periodically so that mobile stations which were not initially in the zone for reception of the signals of a base station can subsequently connect thereto.

It will be appreciated that the invention is not limited to the embodiments described and variations may be made therein without thereby departing from the scope of the invention as defined by the claims.

In particular the aircraft belonging to the same airline being generally handled by a team of ground operatives who are employees of the company, it is possible to provide certain dedicated functions which are automatically carried into effect when an aircraft of that airline arrives on a site.

Although the invention has been described in relation to a system comprising a base station which is permanently fitted in each aircraft, it is possible to provide for implementation of the process of the invention by provisionally fitting a base station to an aircraft after its arrival on the site and removing it just before the aircraft leaves.

What is claimed is:

1. A method for establishing a communication between at least one itinerant subscriber (1) in a vehicle (2) and at least one resident subscriber (3) on a site, said method comprising the step of providing the vehicle with a radio communication base station (4) emitting a beacon signal including an identification of said vehicle for being perceived by at least one mobile station (5) possessed by a resident subscriber (3) and for establishing in said at least at one mobile station (5) a communication with said base station (4).

2. The method for establishing a communication as set forth in claim 1, further comprising the steps of detecting in the base station (4), upon the arrival of the vehicle (2) on a site, available time windows and emitting in said time windows a signal representative of an identity of the vehicle (2) in order to make itself known to the mobile stations (5) present on the site.

3. The method for establishing a communication as set forth in claim 1, further comprising the step of exchanging directory data between the base station (4) and at least one mobile station (5).

4. The method for establishing a communication as set forth in claim 1, wherein the mobile stations (5) perceive several beacon signals emitted by various base stations (4), and the method further comprises the step of selecting a mobile station (5) at least one base station (4) with which a connection is established.

5. The method for establishing a communication as set forth in claim 1, further comprising the step of providing automatic conferencing of several mobile stations (5) in communication with an itinerant subscriber.

* * * * *